B. F. MILLER.
Ventilating-Flue Caps.

No. 157,626. Patented Dec. 8, 1874.

Witnesses,
Chas. H. Smith
Harold Serrell

Inventor
Benjamin F. Miller.
per Lemuel W. Serrell
Atty.

UNITED STATES PATENT OFFICE.

BENJAMIN F. MILLER, OF NEW YORK, N. Y.

IMPROVEMENT IN VENTILATING-FLUE CAPS.

Specification forming part of Letters Patent No. 157,626, dated December 8, 1874; application filed October 26, 1874.

*To all whom it may concern:*

Be it known that I, BENJAMIN F. MILLER, of the city and State of New York, have invented an Improvement in Ventilating-Flue Caps, of which the following is a specification:

In Letters Patent No. 13,620, granted to me, a ventilating-cap is shown with a truncated cone at the upper end of the flue and a hood around an inverted cone to exclude lateral or vertical currents of wind.

My present invention is an improvement upon the same; and consists in a truncated cone applied at a sufficient distance below the upper end of the flue to cause an upward movement of the current passing up the surface of the truncated cone, (instead of said current of air passing diagonally across the upper end of the flue-mouth,) thereby promoting rapidity of motion within the flue itself; and, in order to make the flue-cap a source of light, especially where such caps are over ventilating-flues in garrets or other portions of buildings usually dark, I make use of a glass as a cover to the flue in the place of the cone in aforesaid patent, and provide a drip-ring and delivery-trough, that prevent either rain or water of condensation passing into the said flue.

Figure 1:
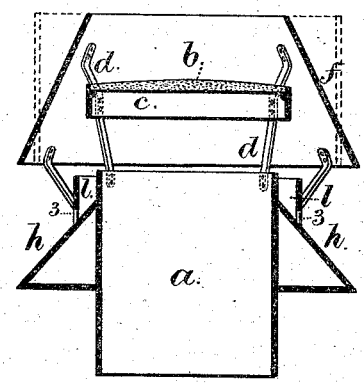
Figure 2:
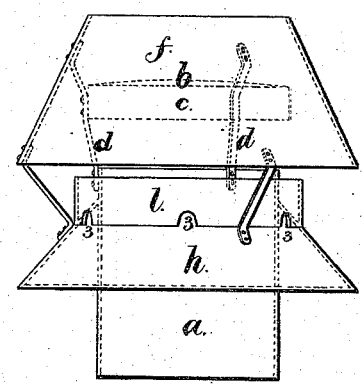
Figure 3:
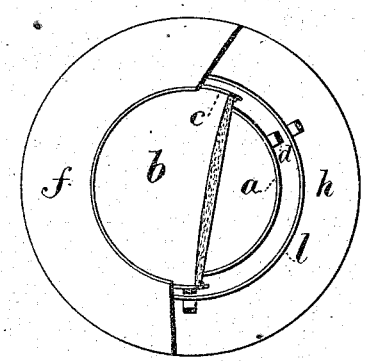
Figure 4:
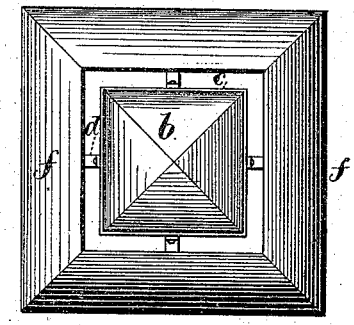

In the drawing, Figure 1 is a vertical section of the ventilator complete. Fig. 2 is an elevation of the same. Fig. 3 is a plan, partially in section, of the round ventilator; and Fig. 4 is a plan of the ventilator in a square form.

The flue $a$ is of a size and shape to be adapted to the chimney or opening to which it is to be affixed. Above this is the flue-cover $b$, made of a glass in a ring, $c$, that is held up by the arms $d$, and these arms are extended, and support the conical hood $f$ that surrounds the flue-cover or glass, there being sufficient space between the hood and cover for the escape of atmosphere or gases passing up through the flue. The skirt $h$ is made as a truncated cone; but, instead of terminating at the top of the flue $a$, said flue $a$ projects above the upper end of said truncated cone for the purposes aforesaid; and it is preferable to use, and I employ, the surrounding ring $l$ that rests upon the surface of the skirt $h$, and is provided with openings 3 3, so that water which drips from the ring $c$ falls between $a$ and $l$, and escapes by the openings 3. This ring $l$ serves as a deflector to direct the upward current of air outside of the ring $c$ and accelerate the draft in the flue $a$.

It is preferable to employ a glass that is slightly concavo convex, so as to throw the water toward the ring $c$ where it drips from the edge. The other parts will act in the manner described when a pyramid or cone takes the place of the glass, as in Fig. 4.

If desired, the hood $f$ may be cylindrical, as indicated by dotted lines in Fig. 1.

I claim as my invention—

1. The combination, in a ventilating-cap, of a glass above the flue, a hood surrounding such glass, and a truncated cone around the upper end of the flue, substantially as set forth.

2. The ring $l$, resting upon the truncated cone $h$, and provided with openings for the escape of water, in combination with the closed ring $c$ above the flue $a$ and the hood $f$ surrounding the same, substantially as set forth.

Signed by me this 21st day of October, A. D. 1874.

B. F. MILLER.

Witnesses:
GEO. T. PINCKNEY,
CHAS. H. SMITH.